UNITED STATES PATENT OFFICE.

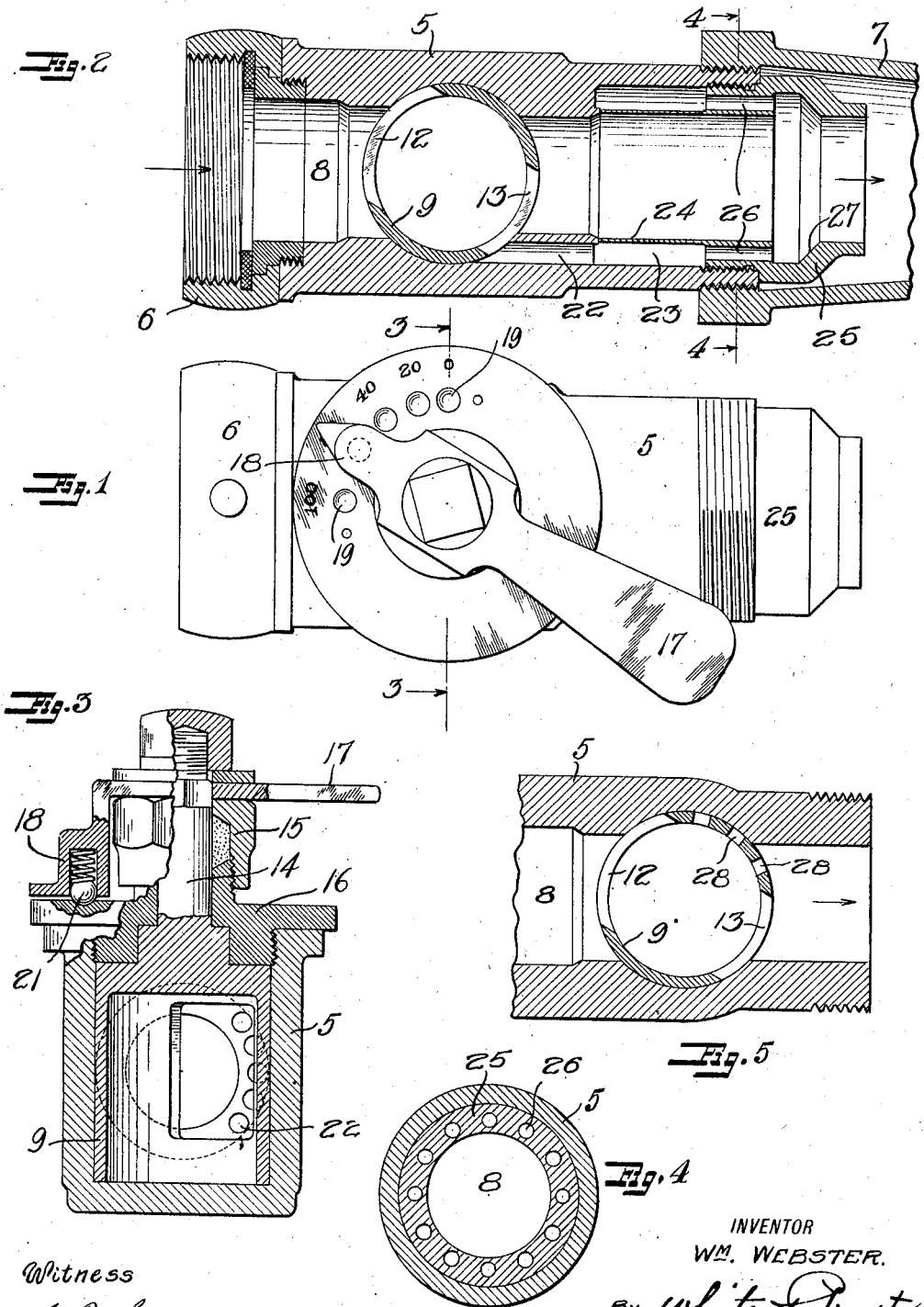

WILLIAM WEBSTER, OF BERKELEY, CALIFORNIA, ASSIGNOR OF ONE-HALF TO HARVEY L. SORENSEN, OF BERKELEY, CALIFORNIA.

VALVE.

1,333,048.

Specification of Letters Patent.

Patented Mar. 9, 1920.

Application filed November 21, 1917. Serial No. 203,066.

*To all whom it may concern:*

Be it known that I, WILLIAM WEBSTER, a citizen of the United States, and a resident of Berkeley, county of Alameda, and State of California, have invented a certain new and useful Valve, of which the following is a specification.

The invention relates to valves and particularly to pressure-reducing valves for use on the discharge end of hose or conduits.

An object of the invention is to provide a pressure-reducing valve for use in connection with a nozzle which is operative to vary the velocity of discharge without destroying the integrity of the discharging jet of liquid.

Another object of the invention is to provide a pressure-reducing valve which is adjustable to produce various discharge pressures.

The invention possesses other advantageous features, some of which, with the foregoing, will be set forth at length in the following description where I shall outline in full that form of the invention which I have selected for illustration in the drawings accompanying and forming part of the present specification. In said drawings I have shown one specific form of my invention and a modification thereof, but it is to be understood that I do not limit myself to such form, since the invention as expressed in the claim may be embodied in other forms.

Referring to said drawings:

Figure 1 is a plan or top view of the valve casing.

Fig. 2 is a horizontal longitudinal section through the valve casing, showing a nozzle attached thereto.

Fig. 3 is a cross section of the valve taken on the line 3—3, Fig. 1.

Fig. 4 is a cross section taken on the line 4—4, Fig. 2.

Fig. 5 is a longitudinal section through a modified form of valve.

The valve of my invention is particularly adapted for use on the discharge end of a fire-hose, although it is in no manner restricted to such use. Water is usually delivered to the fire hose at high pressure, but frequently the high velocity of discharge due to the high pressure is disadvantageous. An object of my invention, therefore, is to provide a valve which may be arranged immediately behind the nozzle, whereby the hoseman may instantly vary the velocity of the discharging stream. It is essential that the integrity of the discharging stream be maintained at all velocities of discharge, otherwise the stream would fan out and disintegrate before it reached the desired area.

The valve comprises a valve casing 5, provided on one end with a hose coupling 6 and on the other end with a screw thread or other coupling to receive the nozzle 7. The casing is provided with a longitudinal passage 8 extending therethrough, and arranged within the casing and in position to control the area of the passage is a hollow rotatable valve plug 9, the wall of which is provided with oppositely-disposed apertures 12—13. The valve plug stem 14 extends through a suitable packing gland 15 formed on the cap 16, which screws into the casing. At its upper end, the valve stem is provided with a suitable lever 17, the end of which is provided with a seat 18 which overlies the surface of the cap 16. The cap surface is provided with a series of depressions 19, which are engaged singularly by a spring-pressed ball 21 arranged in the seat 18. The depressions are marked to indicate pressures and when the ball seats in a given depression, the position of the valve plug is such that the water issues from the nozzle under the indicated pressure.

Formed in the body of the valve casing and opening on the valve seat, are a plurality of auxiliary water passages 22, preferably arranged in a circle, so that they are successively opened or closed as the valve plug is turned. These passages are longitudinally disposed and open into the annular chamber 23, formed between the outer wall of the casing and the cylindrical wall 24, which forms part of the main water passage. The area of the annular chamber is greater than the combined area of the passages 22, so that the velocity of the water is reduced in the chamber. The wall 24 is preferably formed integral with the plug 25 which screws into the valve casing, forming the end wall of the annular chamber. The plug 25 is provided with a plurality of circumferentially-disposed passages 26 through which the water passes from the chamber back into the main stream of water passing through the valve. The combined area of the passages 26 is less than the area of the chamber, so that the water discharges from the passages 26 at an increased velocity. This water which comes through the auxiliary passages strikes and commingles with the main stream of water which has passed through the partly closed main valve opening, reducing the velocity of the main stream, and causes the water to fill the nozzle instead of traveling along one side thereof and thereby produces an integral discharge jet. This velocity-reducing and commingling effect is increased by the circularly-inclined baffle wall 27, forming an extension of the plug 25, against which the auxiliary jets strike and are deflected radially inward against the main stream. The baffle wall is provided with an aperture of substantially the same area as the passage through the valve.

By turning the handle 17, the amount of water passing through the valve is varied and the proportion of the water passing directly through the valve to that which passes through the auxiliary passages is varied, and the velocity of the stream discharging from the nozzle is consequently varied. The auxiliary streams, striking the main stream radially, diminish the velocity of the main stream and as the proportion of the water which passes through the auxiliary passages is increased, the velocity of the stream discharging from the nozzle is decreased.

In Fig. 5, I have shown a modification, in which the auxiliary passages 28 are formed in the wall of the valve plug, and the water passing through the auxiliary openings strikes the main stream after it has passed through the valve plug and retards the velocity thereof. The waters from the main stream and the auxiliary streams are thoroughly mixed and on account of their different directions of movement, the velocity of the resultant stream is retarded, but thoroughly fills the nozzle, so that it is discharged therefrom in an integral jet.

I claim:

A pressure-reducing valve, comprising a valve casing having a main passage therethrough, a valve seat therein and a plurality of auxiliary passages opening on said seat, of a rotatable apertured valve plug controlling the flow of liquid through said main passage and said auxiliary passages, a cylindrical wall forming an annular chamber into which said auxiliary passages open, a plug provided with ports closing one end of said chamber and a baffle wall arranged in front of said ports.

In testimony whereof I have hereunto set my hand at Oakland, California, this 7th day of November, 1917.

WILLIAM WEBSTER.

In presence of—
J. B. GARDNER,
WALTER F. HAYES.